United States Patent [19]
Mori

[11] Patent Number: 5,632,913
[45] Date of Patent: May 27, 1997

[54] NC LASER SYSTEM

[75] Inventor: Atsushi Mori, Minamitsuru-gun, Japan

[73] Assignee: Fanuc Ltd., Japan

[21] Appl. No.: 609,179

[22] Filed: Mar. 1, 1996

Related U.S. Application Data

[63] Continuation of Ser. No. 312,045, Sep. 23, 1994, abandoned.

[30] Foreign Application Priority Data

Oct. 15, 1993 [JP] Japan ..................... 5-257884

[51] Int. Cl.⁶ .................................. B23K 26/00
[52] U.S. Cl. .................. 219/121.6; 219/121.61; 364/474.08
[58] Field of Search ............... 219/121.6, 121.61, 219/121.62, 121.78; 364/474.08, 474.31

[56] References Cited

U.S. PATENT DOCUMENTS

| | | | |
|---|---|---|---|
| 5,004,889 | 4/1991 | Yamazaki et al. | 219/121.61 |
| 5,012,069 | 4/1991 | Arai | 219/121.62 |
| 5,216,222 | 6/1993 | Masuda | 219/121.78 |

FOREIGN PATENT DOCUMENTS

| | | | |
|---|---|---|---|
| 3-155485 | 7/1991 | Japan | 219/121.61 |
| 3-238190 | 10/1991 | Japan | 219/121.61 |
| 4-100687 | 4/1992 | Japan. | |
| 4-135085 | 5/1992 | Japan. | |
| 8808354 | 11/1988 | WIPO | 219/121.62 |

*Primary Examiner*—Geoffrey S. Evans
*Attorney, Agent, or Firm*—Staas & Halsey

[57] ABSTRACT

An NC laser system turns on and off a laser oscillator at a desired timing. A machining program is decoded to deliver a move command for movement along axes, and an ON-OFF command for turning on and off an laser oscillator. In response to the move command, interpolation processing is effected to deliver interpolation pulses. The interpolation pulses are controlled for acceleration and deceleration to generate a deceleration-starting signal and a deceleration-terminating signal. On the other hand, in response to the ON-OFF command, an ON-OFF signal is delivered. For example, the ON-OFF signal is delivered at any of timings of the start of deceleration, the end of deceleration, etc. Further, the ON-OFF signal can be delivered when an actual position of a machining head becomes closest to a directed end point.

2 Claims, 5 Drawing Sheets

NC LASER SYSTEM

This application is a continuation, of application Ser. No. 08/312,045, filed Sep. 23, 1994, now abandoned.

BACKGROUND OF THE INVENTION

(1) Field of the Invention

This invention relates to an NC laser system comprising a laser beam machine and a numerical control system associated therewith, and more particularly to a numerical control (NC) laser system of this kind adapted to deliver an ON-OFF signal for ON-OFF control of a laser oscillator thereof.

(2) Description of the Related Art

When an NC laser system is operated to cut a workpiece of metal or the like by a laser beam generated thereby, the positioning of a machining head is first completed, and then a laser oscillator is turned on in a cutting mode of the system to thereby start machining of the workpiece. However, machining started after completion of positioning of the machining head takes time to cut the workpiece. Therefore, there is conventionally employed a machining method of sending a command to turn on or off the laser oscillator while holding the NC laser system in the cutting mode. According to such a laser beam machining method, the machining head is moved without waiting for completion of positioning of the machining head, which makes it possible to reduce machining time. In laser beam cutting performed by the method, an ON-OFF signal for turning on or off the laser oscillator is generated by the same block of a machining program as that containing a move command for moving the machining head, whereby the laser oscillator is turned on or off according to the ON-OFF signal.

However, in the cutting mode, acceleration/deceleration control is performed for control of the speed of servomotors, which makes an actual machining path different from a path directed by the program due to delay of movement for machining caused by the acceleration/deceleration control. Therefore, even if an ON signal is delivered together with a move command for moving the machining head, the ON signal is not necessarily delivered at an end point of movement of the machining head directed by the move command. If interpolation of a subsequent command for moving the machining head written in the following block has already been started, the ON signal is delivered at a point different from the directed end point.

Particularly, in cutting a small circle, there are cases in which in spite of directions for holding the laser oscillator in an ON state only within or on the circle, the laser oscillator continues to be in the ON state even after the machining head is outside the circle.

SUMMARY OF THE INVENTION

The present invention has been made in view of these circumstances, and the object thereof is to provide an NC laser system which is capable of turning on and off a laser oscillator at a desired timing.

To solve the above-described problems, the invention provides an NC laser system having a laser beam machine and a numerical control system associated therewith, comprising a preprocessing operation unit for decoding a machining program to deliver a move command for movements along axes, and an ON-OFF command for turning on or off a laser oscillator, an interpolating unit responsive to the move command for executing interpolation processing to deliver interpolation pulses, an acceleration/deceleration control unit for controlling the interpolation pulses for acceleration and deceleration, to deliver a deceleration-starting signal and a deceleration-terminating signal, and a timing control unit for delivering an ON-OFF signal for turning on or off the laser oscillator according to the ON-OFF command.

The preprocessing operation unit decodes the machining program, and delivers the move command for movements along axes, and the ON-OFF command for turning on or off the laser oscillator. The interpolating unit responsive to the move command executes interpolation processing and delivers the interpolation pulses. The acceleration/deceleration control unit controls the interpolation pulses for acceleration and deceleration, and delivers the deceleration-starting signal and the deceleration-terminating signal.

On the other hand, the timing control unit delivers the ON-OFF signal according to the ON-OFF command. For example, the ON-OFF signal is delivered at any times, such as the start of deceleration, the end of deceleration, etc.

The above and other objects, features and advantages of the present invention will become apparent from the following description when taken in conjunction with the accompanying drawings which illustrates a preferred embodiment of the present invention by way of example.

DESCRIPTION OF THE PREFERRED EMBODIMENTS

An embodiment of the present invention will be described with reference to the drawings.

Figure 2:
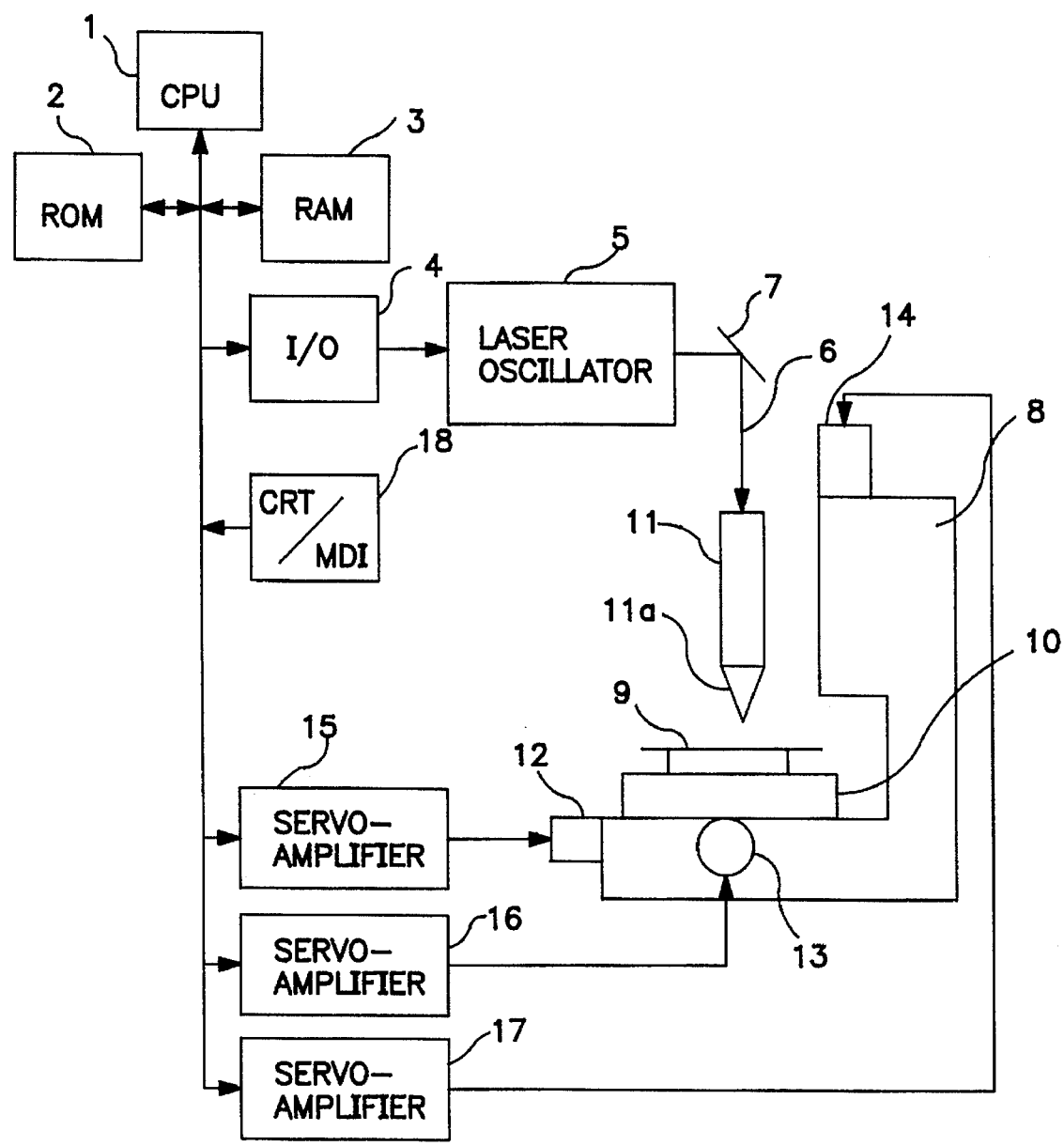
FIG. 2 is a block diagram showing hardware of the NC laser system according to the invention.

FIG. 2 is a block diagram showing hardware of an NC laser system according to the present invention. A processor (CPU) 1 reads out machining programs stored in a memory (RAM) 3, based on a control program stored in a ROM 2, to thereby control the overall operation of the NC laser system. A machining program for execution of the present invention and other parameters are also stored in this memory 3. An I/O unit 4 sends an ON-OFF signal from the processor 1 to a laser oscillator 5. The laser oscillator 5 is controlled for the ON-OFF state thereof by the ON-OFF signal. When the laser oscillator 5 is in an ON state, it generates a laser beam 6. The laser beam 6 is reflected from a bending mirror 7, and transmitted to a laser beam machine 8.

The laser beam machine 8 includes a table 10 for fixing a workpiece 9 and a machining head 11 for irradiating the laser beam 6 onto the workpiece 9. The laser beam 6 introduced into the machining head 11 is restricted in diameter by a nozzle 11a and emitted to the workpiece 9. The laser beam machine 8 includes servomotors 12, 13 for control of movement of the table 10 in two directions of an X-axis and a Y-axis, and a servomotor 14 for control of movement of the machining head 11 upward and downward. These servomotors 12, 13, and 14 are connected to servoamplifiers 15, 16 and 17, respectively, and controlled in respect of rotation thereof by axial movement control signals from the processor 1. Further, instructions or directions to the laser beam machine 8 are given by way of a CRT/MDI unit 18.

Figure 1:
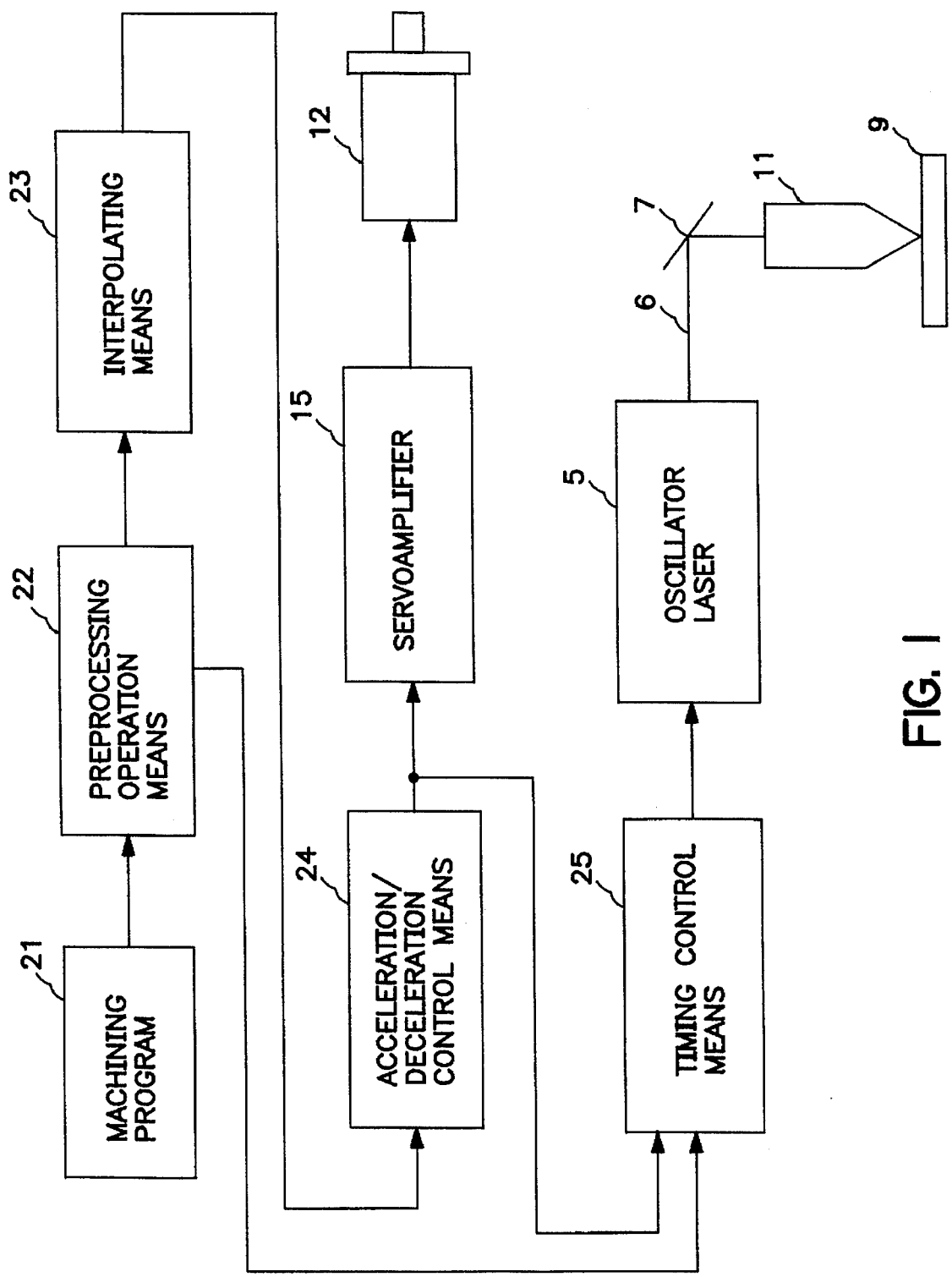
FIG. 1 is a diagram showing the concept of an NC laser system according to the invention.

FIG. 1 is a conceptual representation of the NC laser system according to the present invention. For simplicity of illustration, FIG. 1 shows a servomotor and unit associated therewith for one axis (X-axis) alone, and ones for the other axes are omitted.

A machining program 21 contains move commands for positioning control of the servomotor 12, speed commands for control of speed, and ON-OFF signals for turning on and off the laser oscillator. Preprocessing operation unit 22 reads the machining program 21, decodes same, and delivers a move command and a speed command to interpolating unit 23. The interpolating unit 23 performs interpolation for each axis in response to the move command and the speed command, to deliver interpolation pulses.

Acceleration/deceleration control unit 24 receives and controls the interpolation pulses for acceleration and deceleration, to deliver the resulting controlled pulses to the servoamplifier 15. The servoamplifier 15 drives the servomotor 12 according to the interpolation pulses controlled for acceleration and deceleration.

On the other hand, timing control unit 25 delivers an ON-OFF signal in response to an ON-OFF command from the preprocessing operation unit 22 at a predetermined timing. The timing for delivering the ON-OFF signal will be described later in detail. The laser oscillator 5 is turned on or off in response to the ON-OFF signal. When the laser oscillator 5 is turned on, it generates the laser beam 6, which is deflected by a bending mirror 7, and emitted via the machining head 11 onto the workpiece 9 to cut same.

Figure 3:
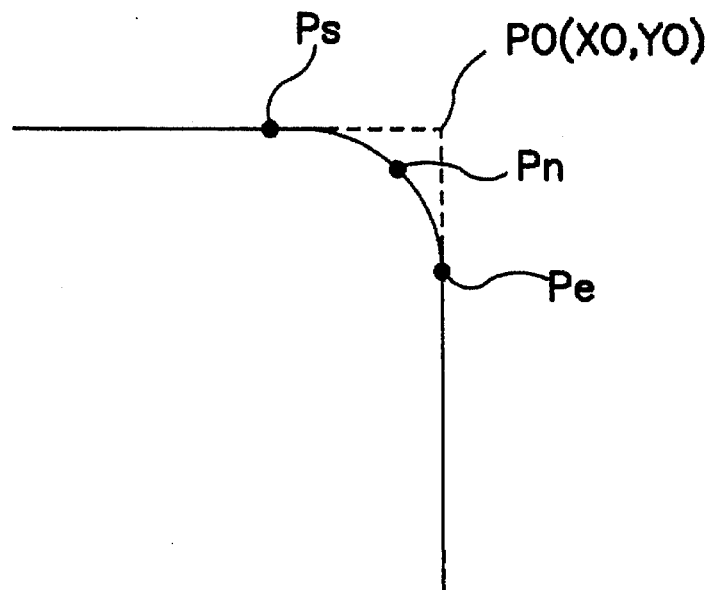
FIG. 3 is a diagram showing a path directed by a move command.

Delivery timing of the ON-OFF signal will be described. FIG. 3 shows a machining path directed by move commands. The move commands here direct that the cutting point should be moved from a point Ps through a point P0 to a point Pe. Actually, the machining head 11 is moved along a path indicated by a curve passing through a point Pn, due to delay of movement caused by the acceleration/deceleration control.

Figure 4:
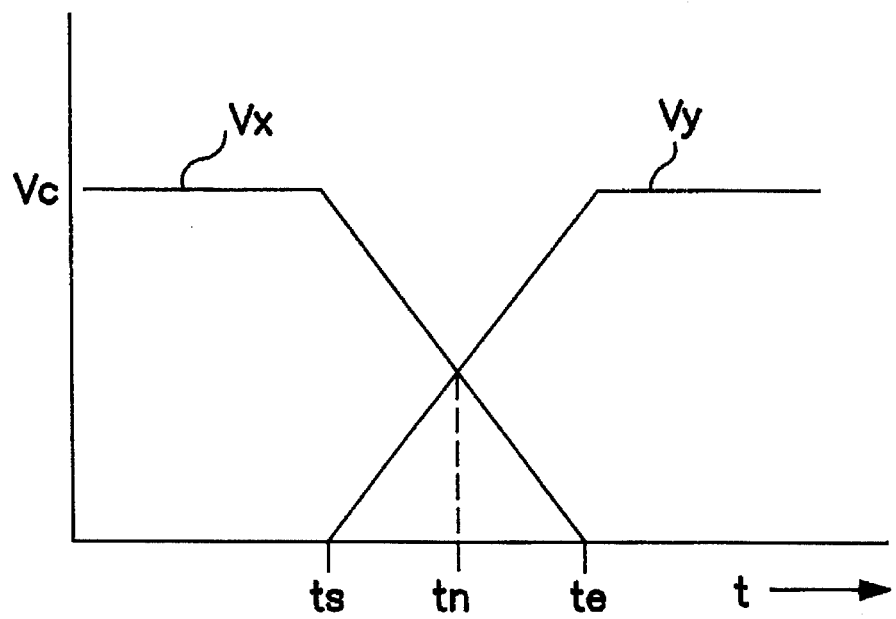
FIG. 4 is a diagram showing curves indicative of speeds along respective axes.

FIG. 4 shows speed curves of movement for machining along respective axes. In the figure, the abscissa represents time, while the ordinate represents speed. Vx represents a speed in the direction of the X-axis and Vy a speed in the direction of the Y-axis. More specifically, when the move commands for the path shown in FIG. 3 are executed, an interpolation for movement control in the direction of the X-axis is terminated and deceleration in the direction of the X-axis is started, at a time point ts. Simultaneously, an interpolation for movement control in the direction of the Y-axis is started, and at a time point tn, the actual position of the machining head 11 becomes closest to the directed end point P0 (see FIG. 3). Then, at a time point re, the deceleration in the direction of the X-axis is terminated, and at the same time, the acceleration in the direction of the Y-axis is also terminated.

Here, the delivery timing of the ON-OFF signal can be set to the time point ts at which the deceleration is started, the time point te at which the deceleration is terminated, or the time point tn at which the machining head is closest to the directed end point P0. Signals indicative of the time point ts at which the deceleration is started and the time point te at which the deceleration is terminated are sent to the timing control unit 25 from the acceleration/deceleration control unit 24. The time point tn at which the machining head is closest to the directed end point is determined in the following manner:

Assuming that an actual position of the machining head along the X-axis is represented by X, an actual position of same along the Y-axis by Y, and the directed end point P0 (see FIG. 3) by coordinates (X0, Y0), the time point tn is a time point at which of the following equation becomes the minimum:

$$\alpha = (X0-X)^2 + (Y0-Y)^2$$

That is, if α is calculated for time points with a predetermined time interval, α decreases to the minimum at the point Pn, as is clear from FIG. 3, and increases thereafter. Therefore, the point Pn closest to the directed end point P0 can be obtained by determining a point where a change in α is inverted from one in a decreasing direction to one in an increasing direction. At this time point tn corresponding to the point Pn, the ON-OFF signal is delivered.

Figure 5:
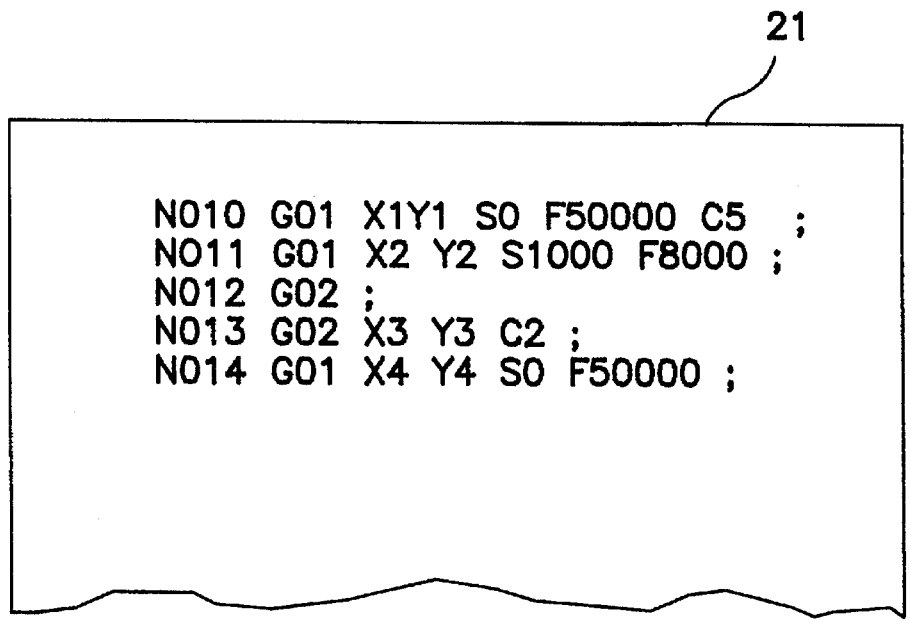
FIG. 5 is a diagram showing an example of a machining program.
Figure 6:
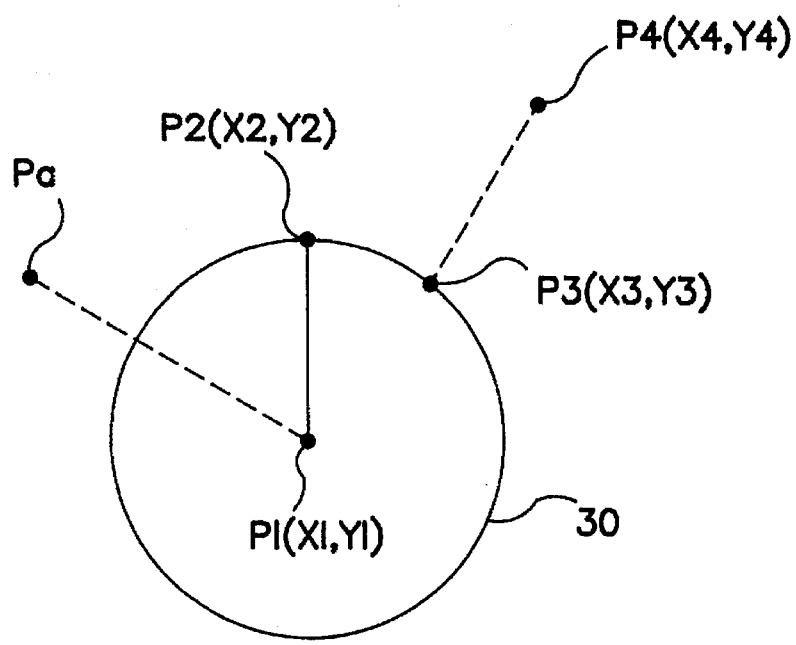
FIG. 6 is a diagram showing a path directed by the machining program of FIG. 5.

Next, details of the machining program will be described. FIG. 5 shows an example of the machining program. FIG. 6 shows a machining path directed by the machining program of FIG. 5. In FIG. 6, the solid line represents portions of the path where the laser beam is irradiated (for cutting a workpiece), and the broken line represents potions of the path where the laser beam is not irradiated.

A block designated by a sequence number N010 directs that the cutting point should be moved from a point Pa to a point P1 (X1, Y1) by cutting feed (G01), with the laser output of 0 (S0) and at a feed speed of 50000 mm/min (F50000). Further, this block contains a command C5 for turning on the laser oscillator at a time point when the machining head becomes closest to the directed end point. That is, the laser oscillator is turned on at a point closest to the directed end point.

A block designated by a sequence number N011 directs that the cutting point should be moved from the point P1 (X1, Y1) to a point P2 (X2, Y2) by cutting feed (G01), with the laser output of 1000 W (S1000) and at a feed speed of 8000 mm/min (F8000).

A block designated by a sequence number N012 directs that the cutting point should be moved from the point P2 round a circle 30 back to the point P2 with the same laser output (1000 W) and at the same feed speed (8000 mm/min) as by the preceding block N011. In short, this block gives the commands for cutting out the circle 30.

A block designated by a sequence number N013 directs that the cutting point should be further moved (cutting should be further effected) from the point P2 to a point P3 on the circle 30, by cutting feed. Further, this block also contains a command (C2) for turning off the laser oscillator at a start of deceleration. Therefore, the laser oscillator is turned off before it reaches the point P3.

A block designated by a sequence number N014 directs that the cutting point should be moved from the point P3 to a point P4, by cutting feed, at a feed speed of 50000 mm/min (F50000) with the laser output of 0 (S0).

For example, commands for the ON-OFF signal can be determined as follows:

C1 ON signal is delivered at the start of deceleration.

C2 OFF signal is delivered at the start of deceleration.

C3 ON signal is delivered at the end of deceleration.

C4 OFF signal is delivered at the end of deceleration.

C5 ON signal is delivered at a point closest to a directed end point.

C6 OFF signal is delivered at the point closest to the directed end point.

Figure 7:
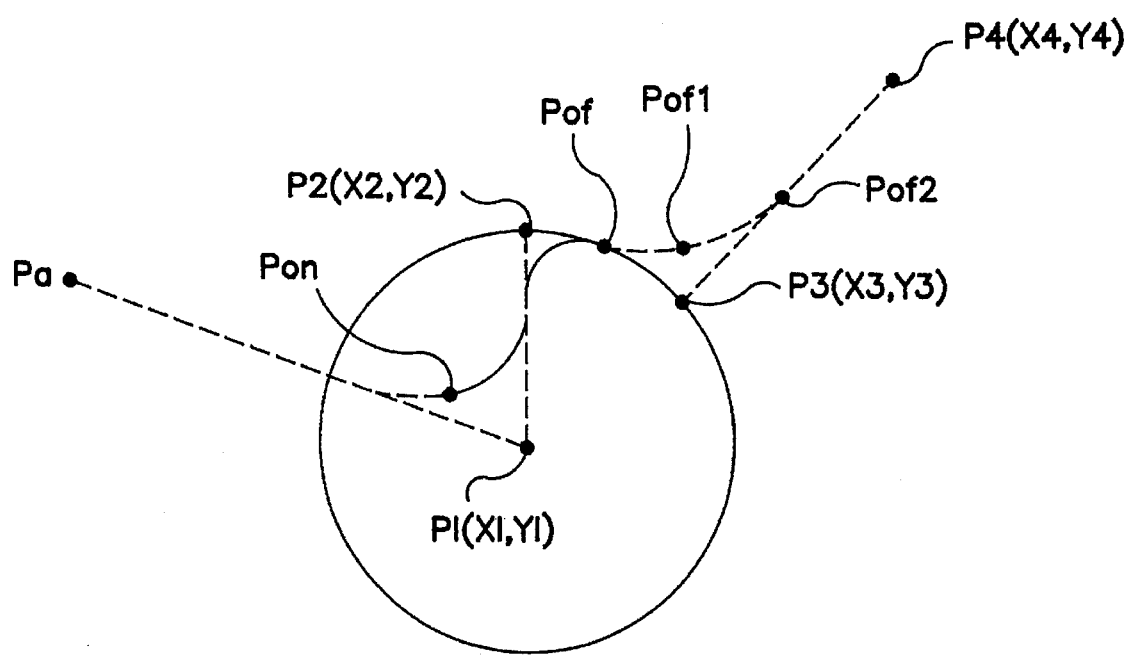
FIG. 7 is a diagram showing an actual machining path.

Next, an actual machining path will be described. FIG. 7 shows the actual machining path. In this figure, similarly to FIG. 6, a portion of the path where the laser beam is irradiated is indicated by a solid line, while a portion of same where it is not irradiated is indicated by a broken line.

As shown in the figure, due to delay of movement for machining caused by the acceleration/deceleration control, the actual machining path is curved inward compared with the directed path (points Pa–P1–P2–P3–P4). Since the block (of N010) for moving the cutting point from the point Pa to the point P1 contains the command (C5) for turning on the laser oscillator at a point closest to the directed end point, an ON signal is delivered at a point Pon to turn on the laser oscillator.

Further, the block (of N013) for moving the cutting point from the point P2 to the point P3 contains the command (C2) for turning off the laser oscillator at the start of deceleration. Accordingly, the laser oscillator is turned off at a point Pof.

If the command C6 (for delivering an OFF signal at a point closest to the directed end point) or the command C4 (for delivering an OFF signal at the end of deceleration) is contained, the laser oscillator would be in an ON state up to a point Pof1, or to a point Pof2, thereby performing an excessive cutting operation in cutting a round hole defined by the circle 30.

Thus, according to the present embodiment, control can be effected such that signals for turning on and off the laser oscillator are delivered at desired time points, which makes it possible to perform a high-speed precision machining.

Although in the above embodiment, the invention is described by way of an example of application thereof to the NC laser system, this is not limitative, but the invention may be applied to a water jet machine, a plasma jet machine, a sealant-applying machine, etc.

As described heretofore, the present invention is constructed such that signals for turning on and off the laser oscillator can be delivered at any of the start of deceleration, the end of deceleration, and a time point that the machining head is closest to a directed end point. Therefore, it is possible to perform a high-speed precision machining.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A numerical control (NC) laser system including a laser beam machine and a numerical control system, comprising:

a laser oscillator to output a laser beam to a machining head for cutting a workpiece on a table;

preprocessing operation unit for decoding a machining program and for outputting (a) a move command for positioning a plurality of servomotors to move said table and to move said machining head and (b) an ON-OFF command for turning one of on and off of said laser oscillator;

interpolating unit, responsive to said move command, for executing an interpolation processing to generate a plurality of interpolation pulses;

acceleration/deceleration control unit for controlling said plurality of interpolation pulses for acceleration and deceleration of said servomotors and for outputting a deceleration-starting signal indicating a time to start deceleration of said servomotors and a deceleration-terminating signal indicating a time to terminate deceleration of said servomotors; and timing control means, responsive to said ON-OFF command, said deceleration-starting signal and said deceleration-terminating signal, for outputting an ON-OFF signal to said laser oscillator for turning one of on and off of said laser oscillator at a predetermined time.

2. The numerical control (NC) laser system according to claim 1, wherein said timing control means outputs said ON-OFF signal at said predetermined time being one of a start of deceleration, an end of deceleration, and a time point that an actual position of said machining head of said NC laser system is closest to an end point directed by said move command.

\* \* \* \* \*